United States Patent
Kellerman

(10) Patent No.: US 12,155,188 B2
(45) Date of Patent: Nov. 26, 2024

(54) CABLE TRAY HAVING COVER PANELS

(71) Applicant: Cablofil, Inc., Mascoutah, IL (US)

(72) Inventor: Dallas Kellerman, Belleville, IL (US)

(73) Assignee: Cablofil, Inc., Mascoutah, IL (US)

( * ) Notice: Subject to any disclaimer, the term of this patent is extended or adjusted under 35 U.S.C. 154(b) by 0 days.

(21) Appl. No.: 18/235,982

(22) Filed: Aug. 21, 2023

(65) Prior Publication Data

US 2024/0006861 A1 Jan. 4, 2024

Related U.S. Application Data

(63) Continuation of application No. 17/854,252, filed on Jun. 30, 2022, now Pat. No. 11,777,287.

(51) Int. Cl.
*H02G 3/04* (2006.01)

(52) U.S. Cl.
CPC ......... *H02G 3/0418* (2013.01); *H02G 3/0456* (2013.01)

(58) Field of Classification Search
CPC .. H02G 3/0418; H02G 3/0437; H02G 3/0456; H02G 3/0493; H02G 3/30; H02G 3/105; H02G 3/128; H02G 3/00; H02G 3/0608; H02G 3/126; H02G 1/08; H02G 11/02; H02G 15/10; H02G 15/117; H02G 3/0425; H02G 3/263; H02G 5/06; H02G 5/08; H02G 9/025; H02G 9/10; F16L 3/02; F16L 3/26; F16L 59/026

See application file for complete search history.

(56) References Cited

U.S. PATENT DOCUMENTS

| 2,656,999 | A |   | 10/1953 | Ullberg, Jr. |            |
|-----------|---|---|---------|--------------|------------|
| 3,003,794 | A | * | 10/1961 | Burley       | H02G 3/0608 |
|           |   |   |         |              | 174/101    |
| 3,022,972 | A |   | 2/1962  | Bunston      |            |
| 3,137,468 | A |   | 6/1964  | Meinders     |            |
| 3,338,599 | A | * | 8/1967  | Hallman      | H02G 3/0608 |
|           |   |   |         |              | 138/158    |
| 3,636,984 | A | * | 1/1972  | Rauhauser    | H02G 3/0418 |
|           |   |   |         |              | 138/158    |

(Continued)

FOREIGN PATENT DOCUMENTS

| CN | 203850781 | 9/2014  |
| CN | 204046090 | 12/2014 |

(Continued)

*Primary Examiner* — Krystal Robinson
(74) *Attorney, Agent, or Firm* — Bryan Cave Leighton Paisner LLP

(57) ABSTRACT

A cable tray cover for a substantially U-shaped cable tray having a base portion and two opposing sidewalls extending upward generally perpendicular to base portion. The cover includes a plurality of interlocking cover panels for covering cable carried by the cable tray, with each cover panel having a top side, with a first end and a second end, with each cover panel configured to extend transverse across the tray. The first end of each cover panel includes a hinge point to allow the second end of the cover panel to rotate and overlap the second end of an adjacent cover panel for use in a radius section of the cable tray. The cover panels may include a hinge slot and a hinge tab, wherein the hinge tab of a cover panel may be placed through the hinge slot of an adjacent cover panel to form the hinge point.

22 Claims, 8 Drawing Sheets

(56) References Cited

U.S. PATENT DOCUMENTS

| | | | | |
|---|---|---|---|---|
| 3,786,171 | A * | 1/1974 | Shira | H02G 3/0425 |
| | | | | 138/108 |
| 3,912,408 | A | 10/1975 | Dominick | |
| 4,046,343 | A | 9/1977 | Kambara | |
| 4,096,349 | A | 6/1978 | Donato | |
| 4,398,564 | A * | 8/1983 | Young | H02G 3/0418 |
| | | | | 138/155 |
| 4,423,284 | A * | 12/1983 | Kaplan | H02G 3/0431 |
| | | | | 52/287.1 |
| 4,944,687 | A | 7/1990 | Mailley et al. | |
| 5,004,192 | A | 4/1991 | Handler | |
| 5,271,585 | A | 12/1993 | Zetena, Jr. | |
| 5,730,400 | A | 3/1998 | Rinderer et al. | |
| 6,188,024 | B1 * | 2/2001 | Benito-Navazo | H02G 3/0608 |
| | | | | 174/101 |
| 6,216,746 | B1 * | 4/2001 | Guebre-Tsadik | H02G 3/0608 |
| | | | | 138/158 |
| 6,313,405 | B1 * | 11/2001 | Rinderer | H02G 3/0456 |
| | | | | 174/99 R |
| 6,350,948 | B1 * | 2/2002 | Decore | H02G 3/105 |
| | | | | 174/488 |
| 6,437,243 | B1 | 8/2002 | VerderVelde et al. | |
| 6,677,533 | B2 | 1/2004 | Bernard et al. | |
| 6,855,884 | B2 | 2/2005 | Spagnoli et al. | |
| 7,049,521 | B2 | 5/2006 | Marcotte et al. | |
| 7,411,126 | B2 | 8/2008 | Herzog et al. | |
| 7,507,906 | B2 * | 3/2009 | Suzuki | H02G 3/32 |
| | | | | 174/72 A |
| 7,576,283 | B2 | 8/2009 | Kadrnoska et al. | |
| 7,612,300 | B2 * | 11/2009 | Owens | G02B 6/4459 |
| | | | | 174/72 A |
| 7,964,796 | B2 * | 6/2011 | Suzuki | H02G 3/0437 |
| | | | | 174/72 A |
| 8,188,368 | B2 * | 5/2012 | Suzuki | B60R 16/0215 |
| | | | | 174/101 |
| 8,960,611 | B1 * | 2/2015 | Wurzer | H02G 9/025 |
| | | | | 248/65 |
| 2006/0090920 | A1 * | 5/2006 | Fujita | B60R 16/0207 |
| | | | | 174/72 A |
| 2009/0050350 | A1 * | 2/2009 | Katsumata | H02G 3/0468 |
| | | | | 174/72 A |
| 2010/0006710 | A1 * | 1/2010 | Lyness | F03D 80/85 |
| | | | | 290/55 |
| 2010/0126900 | A1 | 5/2010 | Boone | |
| 2010/0133390 | A1 * | 6/2010 | Lange | H02G 3/0418 |
| | | | | 248/65 |
| 2012/0068024 | A1 | 3/2012 | Wurzer et al. | |
| 2013/0240681 | A1 * | 9/2013 | Woodlief | F16L 3/26 |
| | | | | 248/300 |
| 2015/0076291 | A1 * | 3/2015 | Winn | H02G 3/0443 |
| | | | | 248/49 |

FOREIGN PATENT DOCUMENTS

| | | | |
|---|---|---|---|
| DE | 29718779 | 10/1998 | |
| DE | 202006019238 | 2/2007 | |
| EP | 1207604 | 5/2002 | |
| EP | 1569312 | 8/2005 | |
| EP | 2293397 | 3/2011 | |
| EP | 2846428 | 3/2015 | |
| FR | 1471497 | 3/1967 | |
| FR | 2626723 | 8/1989 | |
| FR | 2698428 | 5/1994 | |
| FR | 2727186 | 5/1996 | |
| FR | 2773918 | 7/1999 | |
| FR | 2941571 | 7/2010 | |
| FR | 2941752 | 8/2010 | |
| JP | 5886563 | 3/2016 | |
| KR | 101497949 B1 * | 10/2013 | H02G 3/0608 |
| KR | 101497949 | 2/2015 | |
| WO | 2002031939 | 4/2002 | |
| WO | 2002086576 | 10/2002 | |
| WO | 2009073765 | 6/2009 | |

* cited by examiner

CABLE TRAY HAVING COVER PANELS

CROSS-REFERENCE TO RELATED APPLICATIONS

This application is a continuation of U.S. application Ser. No. 17/854,252, filed Jun. 30, 2022, the disclosure of which is incorporated by reference in its entirety.

FIELD OF THE DISCLOSURE

The present disclosure generally relates to accessories for cable tray management systems for carrying electrical wiring, cables, conduit, data transmission lines, and the like, and more particularly to cover panels for attachment to cable trays for preventing debris, dirt, dust, water and other elements from contacting the contents of the cable tray.

BACKGROUND

Cable trays or troughs are used to support cables and the like which run within buildings. Cable tray covers may be used to route, conceal and prevent debris, dirt, dust, water and other elements from contacting the contents of the cable tray. Conventional cable tray covers typically include one or more panels fixedly mounted on beans or supports of the cable tray using some form of hardware.

Cable trays may have both straight, curved, and intersecting sections (including horizontal, vertical, and/or other angled sections) to accommodate the installation requirements of particular settings. In addition, the cable trays may include T fittings, four-way intersection fittings, and the like. Thus, the practical installation of cable trays frequently requires the interconnection of substantially co-planar but nonparallel straight trays by means of an angular or radius cable tray section to provide a smooth, uninterrupted change in the axial direction of the cable management system. Conventional cable tray covers cannot readily be used on curved sections of the cable tray without involving labor intensive installation procedures that often require making modifications to the cable tray covers in the field.

Therefore, it is desirable to have a cable management system that can readily accommodate the use of covers with cable trays designed to route around curves in installation.

SUMMARY OF THE DISCLOSURE

Among the various aspects of the present invention is the provision of a cable tray having cover panels as substantially shown and described.

One aspect of the disclosure is directed to a cover for a substantially U-shaped cable tray having a base portion and two opposing sidewalls extending upward substantially perpendicular to base portion, wherein the cable tray includes a radius section. The cover includes a plurality of interlocking and partially overlapping cover panels for covering cable carried by the cable tray, with each cover panel having a top side, with a first end and a second end, and with each cover panel configured to extend transverse across the tray. The first end of each cover panel includes a hinge point to allow the second end of the cover panel to rotate and overlap the second end of an adjacent cover panel for use in the radius section of the cable tray.

Another aspect of the disclosure is directed to a cover for a cable tray in which each cover panel includes a hinge slot and a hinge tab, wherein the hinge tab of a cover panel may be placed through the hinge slot of an adjacent cover panel to form the hinge point.

Yet another aspect of the disclosure is directed to a cover for a cable tray in which each cover panel includes first and second sides extending generally perpendicular from the top side, a locking tab formed in the first side and a locking slot formed in the first side, and wherein the locking tab may be placed through the locking slot of an adjacent cover panel to form the hinge point.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

DETAILED DESCRIPTION

The accompanying Figures and this description depict and describe embodiments of a cover for a cable tray in accordance with the present disclosure, and features and components thereof. It should also be noted that any references herein to front and back, right and left, top and bottom, upper and lower, and first and second are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the figures. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
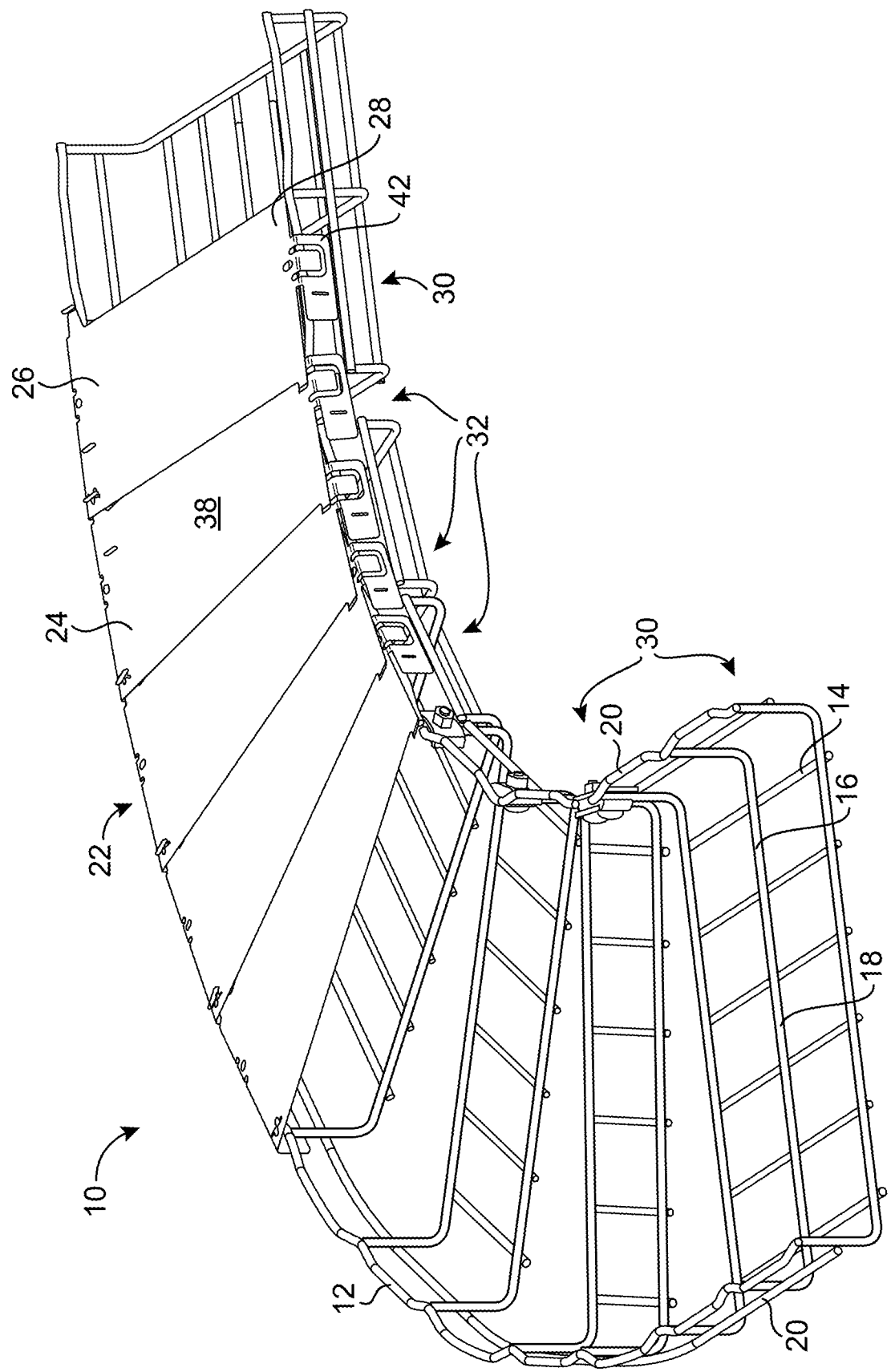
FIG. 1 is a perspective view of a conventional cable tray and cover with a section that includes a bend or radius along its longitudinal direction.
Figure 2:
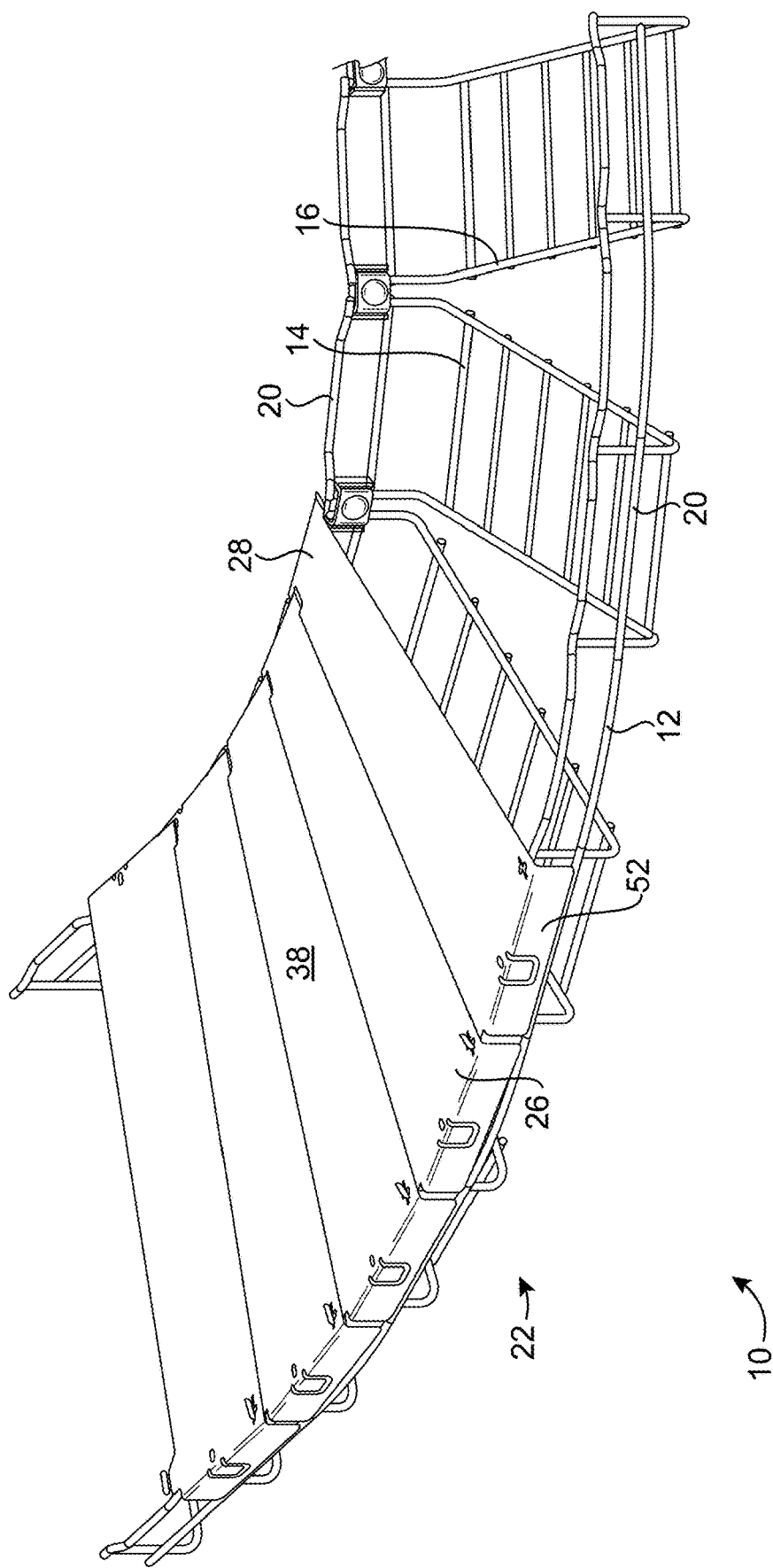
FIG. 2 is another perspective view of the cable tray and cover of FIG. 1.

With initial reference to FIGS. 1 and 2, a cable management system 10 includes a cable tray 12 of the type generally known as a "basket-type mesh" tray comprising a lattice of longitudinal and transverse wires 14, 16 secured to one another to form a grid, with a cable tray cover 22 covering a portion of the cable tray 12. Although cable tray 12 is shown as a basket-style cable tray, it will be understood that cable tray cover 22 may be installed on other types and/or construction of cable trays known to those of skill in the art. Cable tray 12 may be substantially U-shaped having a base portion 18 and two sidewalls 20 extending upward generally perpendicular to base portion 18.

FIGS. 1 and 2 illustrate a cable tray 12 having a radius section 32 integral with or coupled to two straight sections 30 to change the axial direction of the cable management system 10. Of course, the cable tray 12 may only include one or more radius sections 32 without any straight sections 30.

Figure 3:
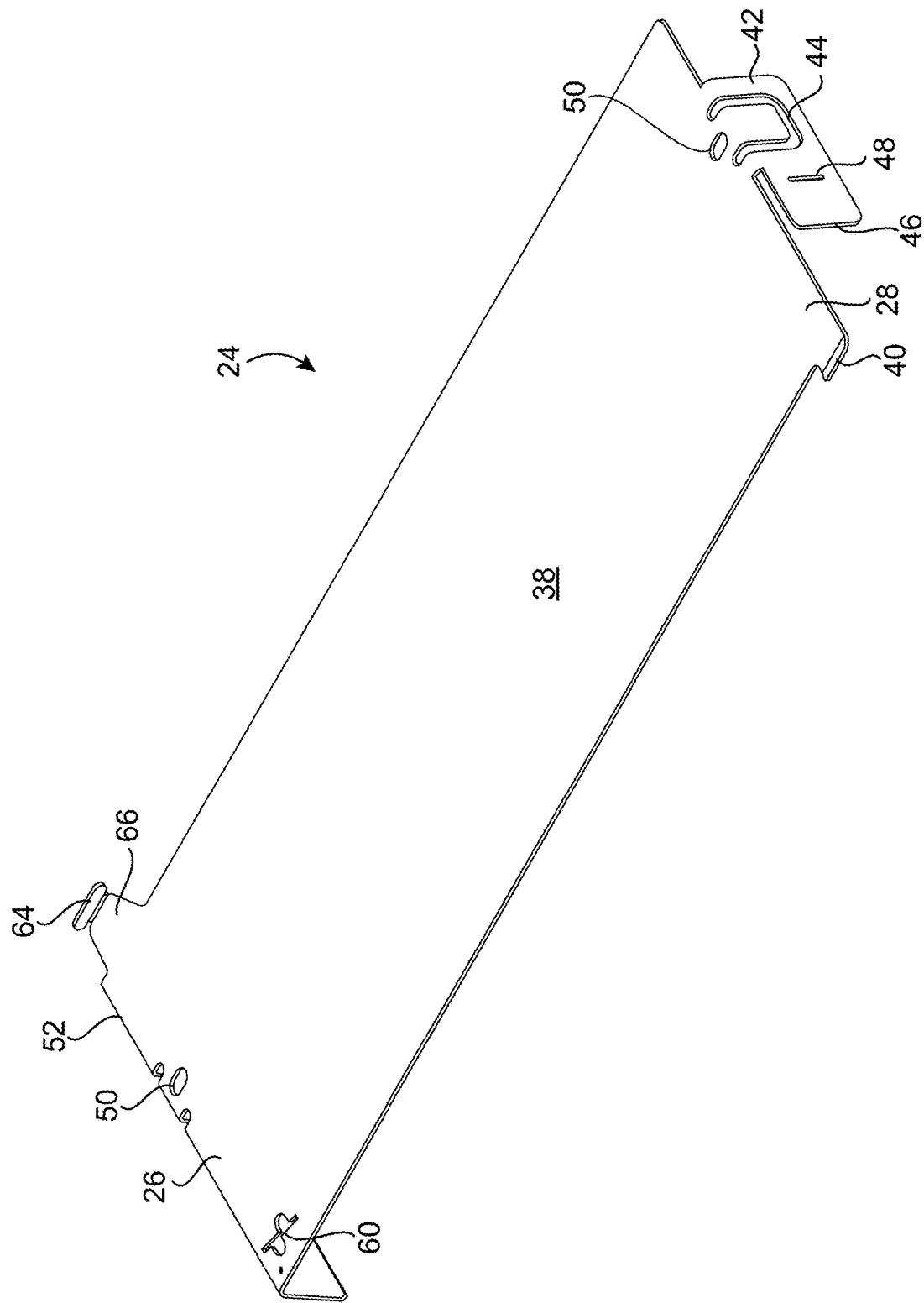
FIG. 3 is a perspective view of a cover panel.
Figure 4:
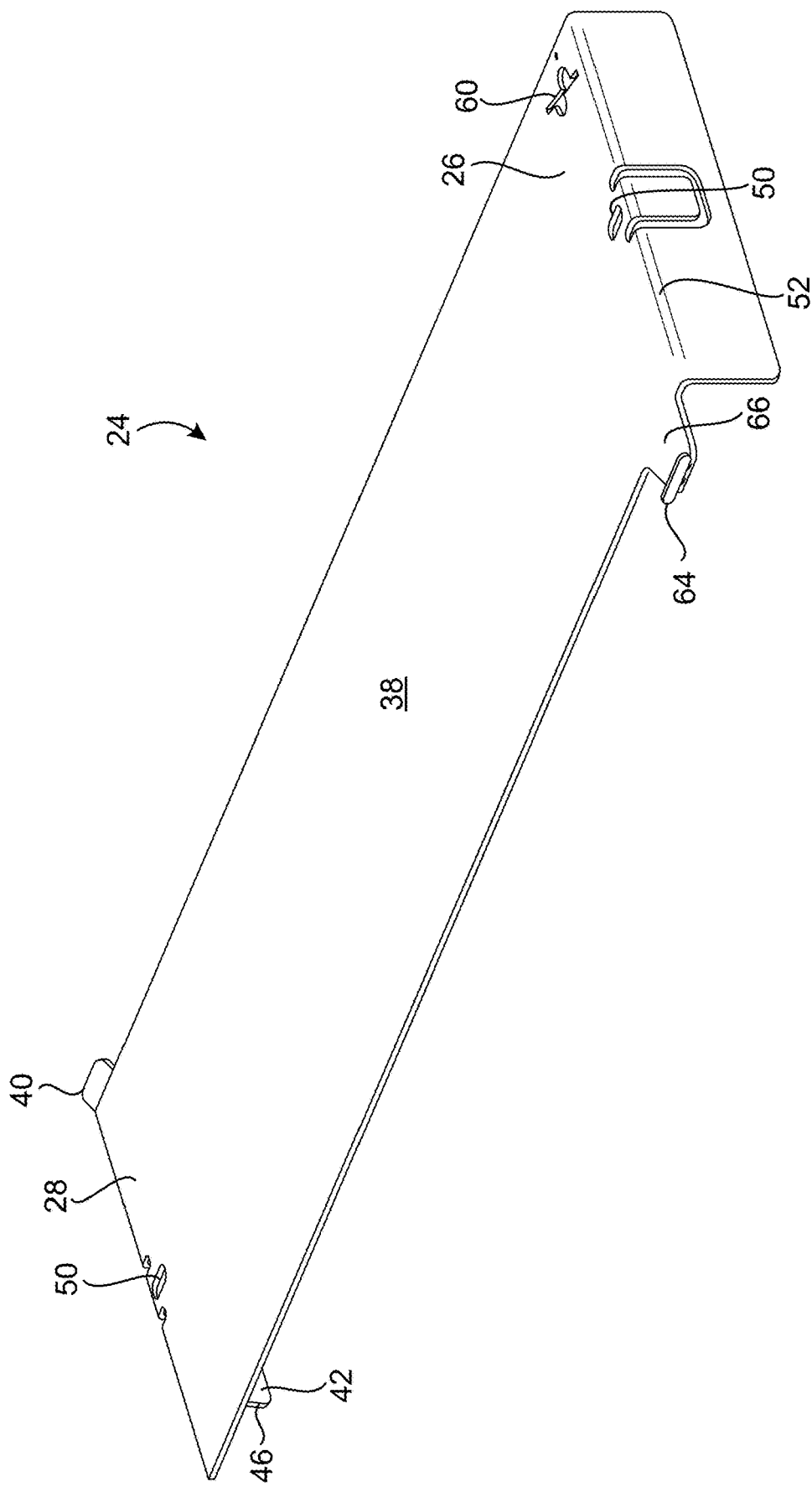
FIG. 4 is another perspective view of the cover panel of FIG. 3.
Figure 5:
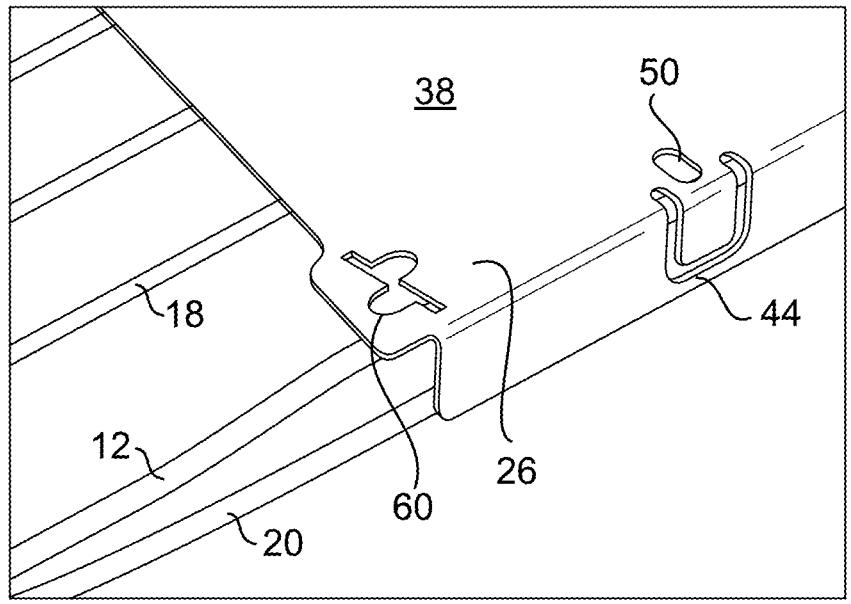
FIG. 5 illustrates a slot in the cover panel.

In use with radius section 32, the cover 22 includes a plurality of interlocking and partially overlapping cover panels 24 for covering cable carried by the cable tray 12. Each of the overlapping cover panels 24 has a top side 38, having a first end 26 and a second end 28. As best illustrated in FIGS. 3 and 4, each cover panel 24 may in certain embodiments include a first side 52 and a second side 42. In such embodiments, the first side 52 of the panel 24 is adjacent to and extends downward from the first end 26 of the top side 38. The second side 42 of the panel 24 is adjacent to and extends downward from the second end 28 of the top side 38. While the cover 22 may include a number of overlapping cover panels 24 that include a hinge and other features to aid in overlapping, the cover 22 may also include a number of non-overlapping cover panels 24 that do not include the hinge and overlapping features described below. Such non-overlapping panels may preferably be used on any straight sections 30 of the cable tray 12, although such straight sections 30 may also be covered with overlapping cover panels 24 described herein that are simply not in an overlapping configuration.

In one embodiment, each cover panel 24 is configured to extend transverse across the tray 12 such that the first side 52 of each panel 24 is disposed over one of the sidewalls 20 of the cable tray 12 and the second side 42 of each panel 24 is disposed over the second of the sidewalls 20 of the cable tray 12. Preferably, the first side 52 of each cover panel 24 is adjacent to and extends downward from the first end 26 of the top side 38 and the second side 42 is adjacent to and extends downward from the second end 28 of the top side 38. The cover panels 24 may be sized in length such that the sides 52, 42 fit snugly over the sidewalls 20 of the cable tray 12 so that the cover panels 24 are held from relative movement via friction. In other embodiments, one or more of the cover panels 24 may lack one or both of the sides 52, 42. In such embodiments, the cover panels 24 may be secured to the sidewalls 20 of the cable tray 12 using, for example, a zip tie or Velcro strap through hole 50 or other conventional securing means.

Each cover panel 24 may also include a stiffening rib (not shown) along the length of the cover panel 24 extending generally from the first end 26 to the second end 28 on the underside of the cover panel 24 opposite the top side 38.

Figure 6:
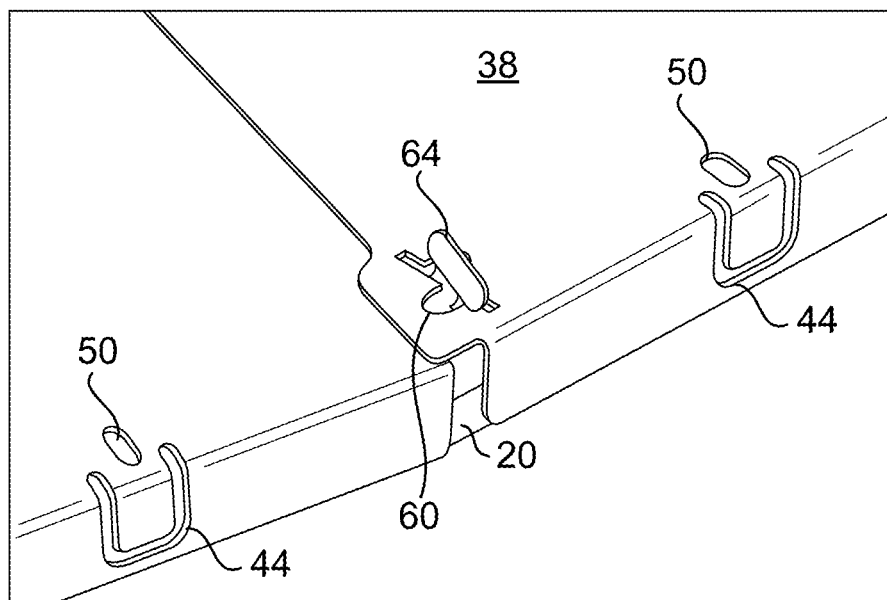
FIG. 6 illustrates the hinge tab of a cover panel inserted into the slot of an adjacent cover panel.

As illustrated in FIGS. 3-6, the first end 26 of each cover panel 24 includes a hinge point formed on the first end 26 of the panel 24 to allow the second end 28 of the cover panel 24 to rotate and partially overlap the second end 28 of an adjacent cover panel 24 for use in the radius section 32 of the cable tray 12. In one embodiment, the first end 26 of each cover panel 24 may include the hinge point formed as a hinge slot 60 and a hinge tab 64, with the hinge tab 64 on the opposing end of the first end 26 of the cover panel 24 from the hinge slot 60. The hinge tab 64 of a cover panel 24 may be placed through the hinge slot 60 of an adjacent cover panel 24 to form the hinge point. The hinge tab 24 preferably extends generally perpendicular to the top side 38 of the cover panel 24 and is sized to fit within the hinge slot 60. After insertion into the hinge slot 60, the hinge tab 64 may be slightly twisted to lock it into the hinge slot 60 as illustrated in FIG. 6. The hinge tab 64 may be formed on an overlapping section 66 of the first end 26 that extends outwardly from the main section of the cover panel 24. In use, the overlapping section 66 will be below the adjacent cover panel 24, i.e., the cover panel 24 having the slot 60 into which the hinge tab 64 of the overlapping section 66 fits into.

Each cover panel 24 may include features designed to aid the cover panels 24 in overlapping onto an adjacent cover panel 24. For example, the second end 28 of each cover panel 24 may include a ramp 40 to better permit the cover panel 24 to overlap an adjacent cover panel 24 by riding up and over the adjacent cover panel 24 when the cover panel 24 is covering a radius section 32 of the cable tray 12.

FIGS. 3 and 4 also illustrate some potential features of the first side 52 and the second side 42 of a cover panel 24. The first side 52 and second side 42 may include one or more bend-over tabs 44 adapted to be bent over one of the sidewalls 20 of the cable tray 12 to secure the cover panel 24 to the cable tray 12. The second side 42 of at least one cover panel 24 may also include an extension flange 46 adapted to be flared outwardly away from the cover panel 24 when the radius section 32 of the cable tray 12 has a relatively tight radius. The extension flange 46 may further include a bend slot 48 that aids in flaring the extension flange 46 outwardly.

Figure 7:
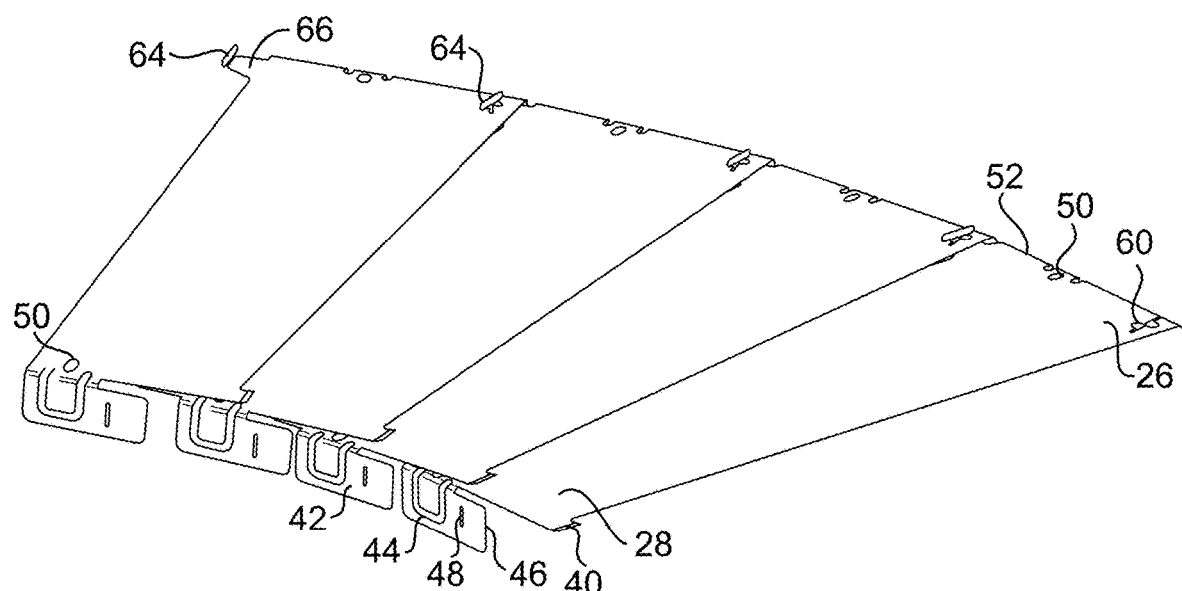
FIG. 7 illustrates a plurality of overlapping cover panels for use in a radius section of a cable tray.
Figure 8:
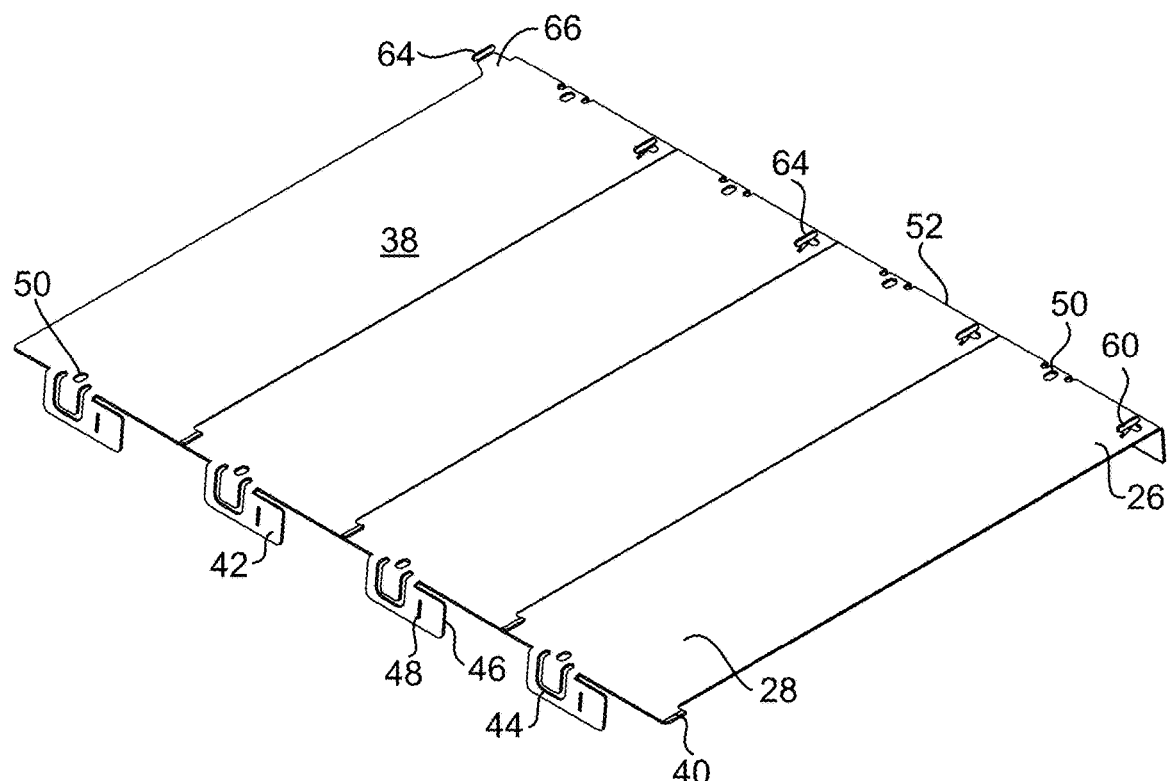
FIG. 8 illustrates a plurality of non-overlapping cover panels for use in a straight section of a cable tray.

FIGS. 7 and 8 illustrate a plurality of cover panels 24 in an overlapping and non-overlapping configuration.

Figure 9:
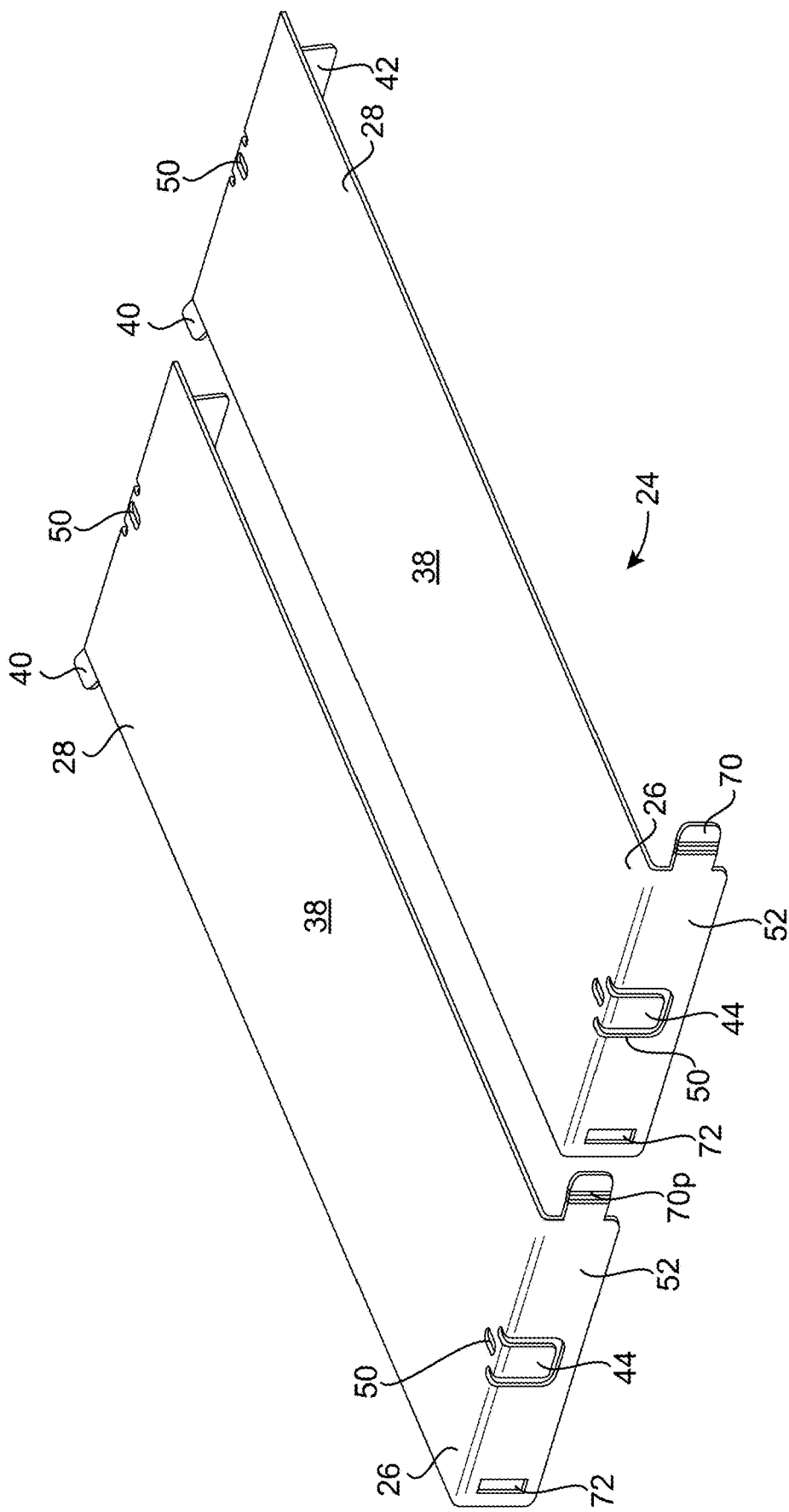
FIG. 9 is a perspective view of two cover panels in accordance with another embodiment of the present invention.
Figure 10:
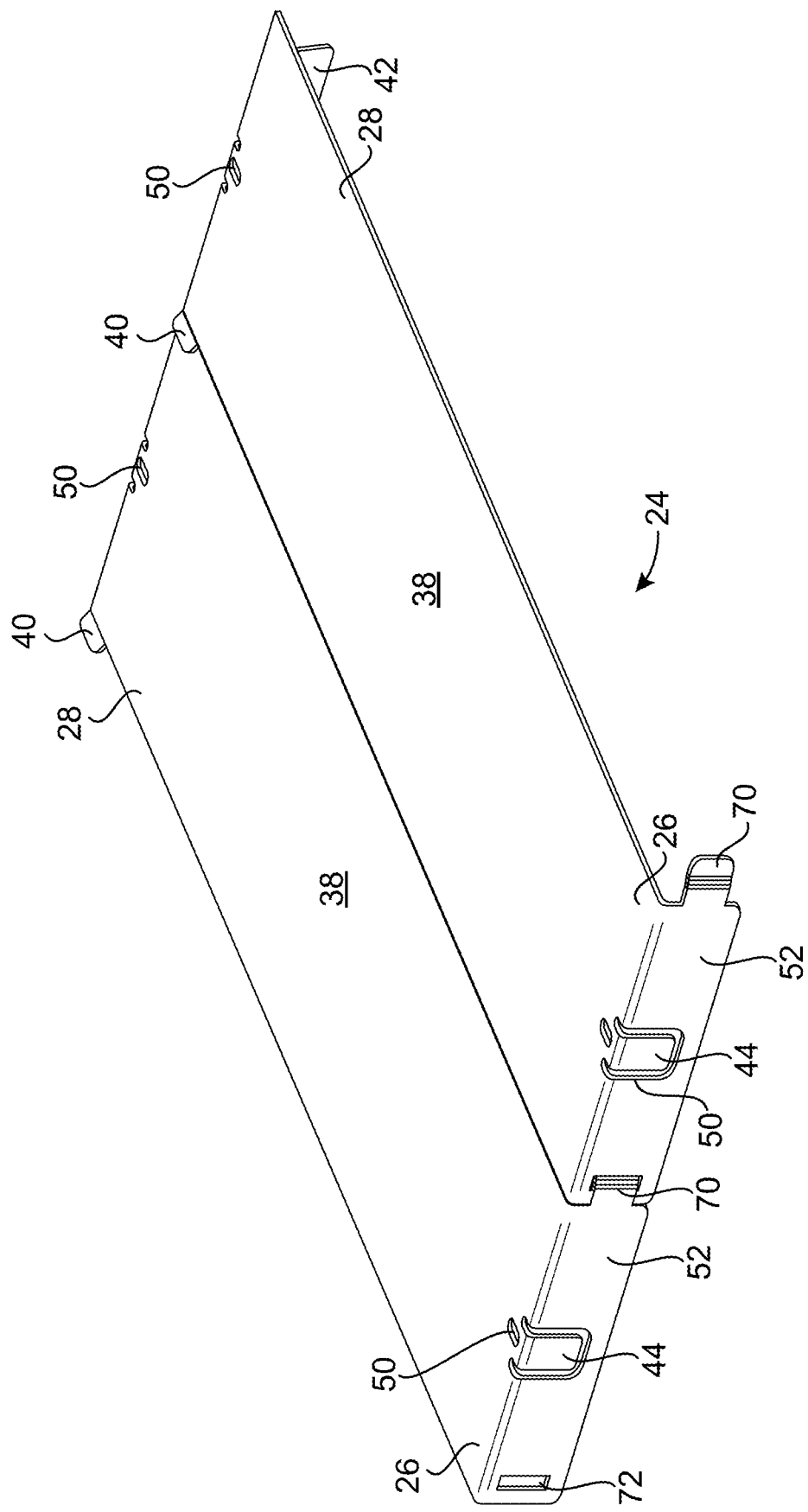
FIG. 10 is a perspective view of the cover panels of FIG. 10 illustrated as the panels are hinged together.

FIGS. 9 and 10 illustrate an alternative embodiment for the hinge point. In this embodiment, the first side 52 of each cover panel 24 includes a locking tab 70 designed to mate with a locking slot 72 such that the locking tab 70 may be placed through the locking slot 72 of an adjacent cover panel 24 to form the hinge point. Preferably, the locking tab 70 may be angled or offset along its length to aid in allowing the second end 28 of the cover panel 24 to rotate and ride up onto the second end 28 of the adjacent cover panel 24 when the cover panel 24 is used with a radius section 32 of the cable tray 12.

Cover panels 24 may preferably be constructed of any type of suitable material including metals and plastics such as stainless steel, aluminum or alloys thereof.

In some embodiments, when installed on cable tray 40, cover panels 24 may be secured to cable tray 12 through the use of one or more fasteners. Such fasteners may include, but are not limited to, braces and/or bracket systems, clips, nuts and bolts, and the like.

Having described the invention in detail, it will be apparent that modifications and variations are possible without departing the scope of the invention defined in the appended claims. For example, although the cable tray in the examples provided is in the form of a grid cable tray, those skilled in the art will readily appreciate that the cable tray may take other forms, such as solid channel formed from aluminum or plastic. Furthermore, it should be appreciated that all examples in the present disclosure are provided as non-limiting examples.

What is claimed is:

1. A cover for a substantially U-shaped cable tray having a base portion and a first opposing sidewall and a second opposing sidewall extending upward generally perpendicular to the base portion, wherein the substantially U-shaped cable tray comprises a radius section, the cover comprising:
   a plurality of interlocking cover panels for covering a cable carried by the substantially U-shaped cable tray, each cover panel comprising a top side, having a first end and a second end, with each cover panel configured to extend transverse across the substantially U-shaped cable tray, wherein
      the first end of each cover panel comprises a hinge point;
      each cover panel is configured to interlock through a portion of an adjacent cover panel at the hinge point, wherein the adjacent cover panel extends transverse across the substantially U-shaped cable tray; and
      the second end of each cover panel is configured to rotate and overlap the second end of the adjacent cover panel for use in the radius section of the substantially U-shaped cable tray.

2. The cover of claim 1 wherein each cover panel comprises a hinge slot and a hinge tab, wherein the hinge tab of a cover panel may be placed through the hinge slot of the adjacent cover panel to form the hinge point.

3. The cover of claim 2 wherein the hinge tab extends generally perpendicular to the top side of the cover panel.

4. The cover of claim 2 wherein the hinge tab is formed on an overlapping section of the first end of the cover panel.

5. The cover of claim 1 wherein each cover panel comprises a ramp formed in the second end of the cover panel, wherein the ramp allows the cover panel to overlap the adjacent cover panel.

6. The cover of claim 1 wherein each cover panel further comprises a first side adjacent to and extending downward from the first end of the top side, and a second side adjacent to and extending downward from the second end of the top side;
   wherein the first side of each panel is disposed over the the first opposing sidewall of the substantially U-shaped cable tray and the second side of each cover panel is disposed over the second opposing sidewall of the substantially U-shaped cable tray.

7. The cover of claim 6 wherein each cover panel comprises a locking tab formed in the first side and a locking slot formed in the first side, wherein the locking tab may be placed through the locking slot of the adjacent cover panel to form the hinge point.

8. The cover of claim 6 wherein the second side of each cover panel comprises a bend-over tab adapted to be bent over one of the sidewalls of cable tray to secure the cover panel to the cable tray.

9. The cover of claim 6 wherein the first side of each cover panel comprises a bend-over tab adapted to be bent over one of the sidewalls of cable tray to secure the cover panel to the cable tray.

10. The cover of claim 6 wherein the second side of at least one cover panel comprises an extension flange adapted to be flared outwardly away from the cover panel when the radius section of the substantially U-shaped cable tray has a relatively tight radius.

11. The cover of claim 10 wherein the extension flange comprises a bend slot that aids in flaring the extension flange outwardly.

12. A cable management system comprising:
   a substantially U-shaped cable tray for carrying cable, the substantially U-shaped cable tray having a base portion a first opposing sidewall and a second opposing sidewall extending upward generally perpendicular to the base portion, wherein the substantially U-shaped cable tray comprises a radius section; and
   a cover comprising a plurality of interlocking cover panels for covering a cable carried by the substantially U-shaped cable tray, each cover panel comprising a top side, having a first end and a second end, with each cover panel configured to extend transverse across the substantially U-shaped cable tray, wherein:
      the first end of each cover panel comprises a hinge point;
      each cover panel is configured to interlock through a portion of an adjacent cover panel at the hinge point, wherein the adjacent cover panel extends transverse across the substantially U-shaped cable tray; and
      the second end of each cover panel is configured to rotate and overlap the second end of the adjacent cover panel for use in the radius section of the substantially U-shaped cable tray.

13. The cable management system of claim 12 wherein each cover panel comprises a hinge slot and a hinge tab, wherein the hinge tab of a cover panel may be placed through the hinge slot of the adjacent cover panel to form the hinge point.

14. The cable management system of claim 13 wherein the hinge tab extends generally perpendicular to the top side of the cover panel.

15. The cable management system of claim 13 wherein the hinge tab is formed on an overlapping section of the first end of the cover panel.

16. The cable management system of claim 12 wherein each cover panel comprises a ramp formed in the second end of the cover panel, wherein the ramp allows the cover panel to overlap the adjacent cover panel.

17. The cable management system of claim 12 wherein each cover panel further comprises a first side adjacent to and extending downward from the first end of the top side, and a second side adjacent to and extending downward from the second end of the top side;
   wherein the first side of each panel is disposed over the first opposing sidewall of the substantially U-shaped cable tray and the second side of each cover panel is disposed over the second opposing sidewall of the substantially U-shaped cable tray.

18. The cable management system of claim 17 wherein each cover panel comprises a locking tab formed in the first side and a locking slot formed in the first side, wherein the locking tab may be placed through the locking slot of the adjacent cover panel to form the hinge point.

19. The cable management system of claim 17 wherein the second side of each cover panel comprises a bend-over tab adapted to be bent over one of the sidewalls of cable tray to secure the cover panel to the cable tray.

20. The cable management system of claim 17 wherein the first side of each cover panel comprises a bend-over tab adapted to be bent over one of the sidewalls of cable tray to secure the cover panel to the cable tray.

21. The cable management system of claim 17 wherein the second side of at least one cover panel comprises an extension flange adapted to be flared outwardly away from the cover panel when the radius section of the substantially U-shaped cable tray has a relatively tight radius.

22. The cable management system of claim 21 wherein the extension flange comprises a bend slot that aids in flaring the extension flange outwardly.

* * * * *